(12) United States Patent
Sevenhans

(10) Patent No.: US 6,707,860 B1
(45) Date of Patent: Mar. 16, 2004

(54) DC OFFSET CORRECTION FOR DIRECT-CONVERSION RECEIVER

(75) Inventor: Joannes Mathilda Josephus Sevenhans, Brasschaat (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/495,451

(22) Filed: Feb. 1, 2000

(30) Foreign Application Priority Data

Feb. 5, 1999 (EP) .............................................. 99400271

(51) Int. Cl.⁷ .......................... H04L 25/06; H04L 27/10; H04L 27/22
(52) U.S. Cl. ...................... 375/319; 375/281; 375/284; 375/332; 329/304
(58) Field of Search ................................ 375/319, 316, 375/317, 329, 331, 340, 281, 284, 332; 329/304; 364/571.01

(56) References Cited

U.S. PATENT DOCUMENTS

| | | | |
|---|---|---|---|
| 5,442,655 A | * | 8/1995 | Dedic et al. .................. 375/340 |
| 5,774,375 A | * | 6/1998 | Behrent .................. 364/571.01 |
| 5,838,737 A | * | 11/1998 | Yamaguchi et al. ......... 375/331 |
| 6,259,748 B1 | * | 7/2001 | Yim et al. ................... 375/329 |

FOREIGN PATENT DOCUMENTS

| | | |
|---|---|---|
| EP | 0 343 273 A1 | 11/1989 |
| EP | 0 455 089 A1 | 11/1991 |
| EP | 0 594 894 A | 5/1994 |
| EP | 0 851 640 A2 | 7/1998 |
| GB | 2 267 629 A | 12/1993 |

OTHER PUBLICATIONS

"The Challenges of Analogue Circuit Design in Mobile Radio VLSI chips", by Jan Sevenhans and Dirk Rabaey, Microwave Engineering Europe, May 1993, pp. 53–59.

* cited by examiner

Primary Examiner—Young T. Tse
Assistant Examiner—Sam K. Ahn
(74) Attorney, Agent, or Firm—Sughrue Mion, PLLC

(57) ABSTRACT

A method and offset removing apparatus for removing DC offset from a digital baseband signal value pair included in a set of digital baseband signal value pairs is described. The digital baseband signal value pairs, when plotted on a complex signal space I-Q diagram, lie on a predetermined figure. The I and Q coordinates of the central point of this predetermined figure are determined by a two-dimensional fitting of this figure through a subset of signal value pairs included within the set. These coordinates of this center point are subsequently subtracted from the I and Q coordinates of the digital baseband signal.

9 Claims, 3 Drawing Sheets

DC OFFSET CORRECTION FOR DIRECT-CONVERSION RECEIVER

BACKGROUND OF THE INVENTION

The present invention relates to a method for removing DC offset from a digital baseband signal value pair included in a set of digital baseband signal value pairs and to an offset removing apparatus for performing such a method.

Such a method and offset removing apparatus are for instance described in the published UK Patent Application, publication NR GB 2 267 629. Therein a method of processing of a set of digital baseband signal-value pairs is described, whereby each pair of the set is made up of an inphase signal value and a corresponding quadrature signal value such that, if these are plotted on an I-Q diagram, the plotted pairs lie on a common circle, as is further described in this prior art document. The processing consists of averaging the inphase signal values of a set to produce an I-direction means value, and by performing the same operation on the quadrature signal value pairs to thereby producing a Q-direction means value. Further processing in the prior art document consists of subtracting the thus obtained respective average values from the individual inphase, respective quadrature, signal values, followed by other fine tuning steps, as extensively described in the prior art document, thereby aiming at removing the DC offset from the digital baseband signal. An arrangement including means for performing these processing steps, is as well described in this prior art document.

This method, as well as other signal averaging methods for determining the DC offset, which can be found in present literature, is however not always adequate, especially in case this DC offset can vary suddenly and substantially as a function of the time. A worst case situation being such that a first half of the signal-value pairs of such a set is subject to a relatively low DC offset value, whereas a second half is subject to a very high DC offset value or vice-versa. Indeed, in all these prior art DC offset cancellation systems, the DC offset is determined by performing an averaging operation using all samples of a burst incoming digital baseband signal value pairs. This burst thus corresponds to the set of digital baseband signal value pairs as is described in the preamble of the first claim of this document. In GSM systems however, due to high-blocking signals self-mixing, a sudden increase in the DC offset can occur in the middle of such a burst. Indeed, these high blocking signals originate from random access bursts generated by neighbouring terminals. If these are picked up by the antenna of a GSM burst mode receiver, these may leak to the local oscillator input of the mixer. Even though they are modulated at a carrier which frequency is laying far enough from the normal signal modulation carrier, they may become DC offset signals for the normal DC demodulated signals, due to leakage of the antenna of the demodulator, and subsequent so-called self-mixing within this demodulator circuit during the direct conversion demodulation of the carrier wave signal. This latter process is described in the published European patent application, publication number 0 594 894 A1. The amplitude of these dynamic blocking levels may exceed these of the normal signal bursts even with 80 dB, stated by the GSM specification 0505. Moreover, these can suddenly appear, the worst case situation being such that these signals appear in the middle of a normal signal burst, representing the aforementioned worst case situation, whereby the set of signal value pairs thus corresponds to a burst of signals received by the receiver.

Averaging methods which aim at determining the DC offset in the data signals, by averaging these signals over a complete burst, will thus result in a completely wrong determined DC offset for this worst case situation. Even very sophisticated averaging methods such as described in the last mentioned European patent application and in the published paper "The challenges for analogue circuit design in mobile radio VLSI chips", written by Jan Sevenhans and Dirk Rabaey, published in Microwave Engineering Europe, May 1993, pp. 53–59, may therefore not be future safe enough, since the problem of the dynamic blocking level mixing DC offset may become worse with the increase in use of GSM mobile terminals. Indeed, with a widespread use of GSM terminals, the probability of occurrence of these self-mixing dynamic blocking levels increases considerably.

SUMMARY OF THE INVENTION

An object of the present invention is to provide a method and an offset removing apparatus of the above known type but allowing a dynamic and accurate determination of the dynamically changing DC offset, in a simple way.

According to the invention, this object is achieved due to the fact that said method further includes the steps as described in claim 1, and in that said offset removing apparatus is further adapted as described in claim 5.

In this way, by considering both the inphase and quadrature signal value pairs together as one point in the I-Q plane, and by two-dimensionally fitting this well-known geometrical figure through a subset of points in the I-Q plane, such that the center of this geometrical figure is obtained. Since this center corresponds to the DC offset, the DC offset can thus exactly be determined. In case this operation is repeated on subsequent ones of such sets or subsets within a complete burst, a jump in the DC offset can easily be discovered. By taking the subset such that the minimum amount of points, required for fitting the known figure is taken, the highest accuracy is obtained since this will reduce the amount of faulty detections. Since this solution does not require any feedback loop or a sophisticated algorithm, a very simple solution is thereby obtained.

Yet a further characteristic feature of the present invention is mentioned in claims 2 and 6.

When the thus determined DC offset coordinates are subsequently subtracted from the I, resp, Q signal values of the original data points, it is evident that also the DC offset will be more accurately removed.

Another characteristic feature of the present invention is described in claims 3 and 7.

In this way, a simple and accurate method for detecting and for removing DC offsets from at least one burst of received carrier wave modulated signals is obtained. The offset removing apparatus is thereby also adapted for removing DC offset of such bursts, as is described in claim 7.

Further characteristic features of the present invention are described in claims 4 and 8.

By selecting successive sets and subsets from a burst, and by repeating the aforementioned steps on subsequent ones of such sets, the accuracy of the determination of the DC offset can thus be significantly increased. A very simple variant could for instance consist of performing the fitting operation of a first set of samples selected in the beginning of the burst, and on a second set of samples selected from the end of the burst. By this simple method a jump in the DC offset can already be observed.

The present invention further also refers to a burst mode receiver incorporating such an offset cancellation means, as described in claim 9.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
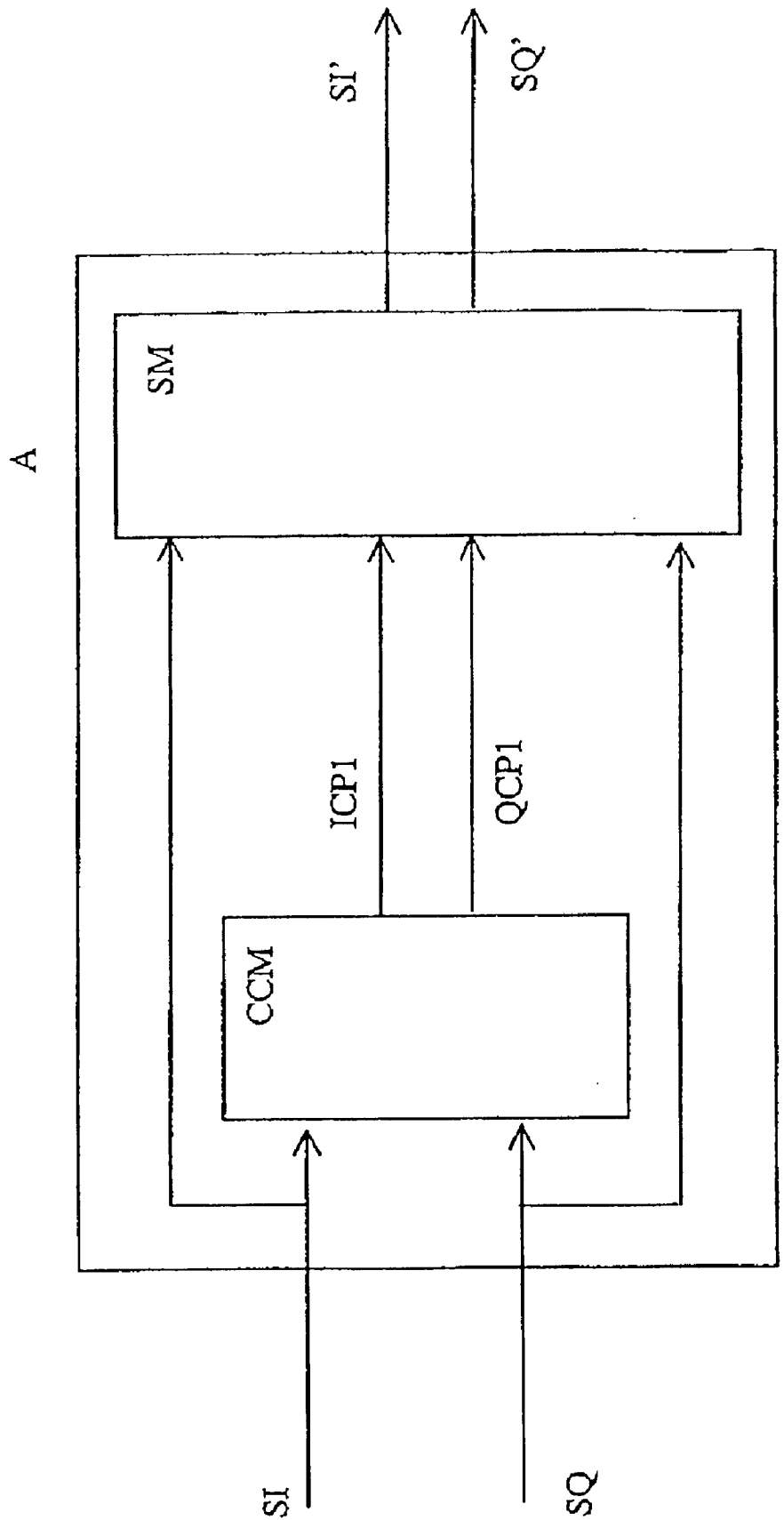
FIG. 1 represents an offset removing apparatus A according to the invention.

The offset removing apparatus A of FIG. 1, which is adapted to realise the DC offset removing method of the present invention receives a set of digital baseband signal value pairs. Each of these pairs, for instance the drawn pair SI,SQ, thereby includes an inphase SI, resp. a quadrature SQ, component of a vector of a digital baseband signal. For more explanation about how to represent such a baseband signal as a complex vector in the complex I-Q plane, we refer to the already mentioned prior art UK patent application GB 2 267 629.

The apparatus A is only suited to operate on digital baseband signals which are such that, if all of these inphase, resp. quadrature, component values of all vectors of the incoming set of digital baseband signals are plotted as I, resp. Q coordinates in such an I-Q plane, these are all lying onto a well-known geometrical figure. This figure may consist of a circle, which is for instance the case for GSM Gaussian Minimum Shift Keying, abbreviated with GMSK, signals, or for hybrid fiber coax quadrature amplitude modulation, abbreviated with QAM, signals. Using other modulation schemes however, such as carrierless amplitude/phase modulation, abbreviated with CAP, another geometrical figure such as a square may be the case.

Without any DC offset, this geometrical figure is centered around the origin of this I-Q plane. A DC offset in the baseband signals of the set manifests itself then as a shift of the center of this geometric figure with respect to the origin, as was already explicitly described for the GSM case in the UK patent number UK 2 267 629.

In general DC offset removing methods basically consist of first determining the I and Q coordinates of this center point, and subsequent subtracting them respectively from the I and Q coordinates of the data points, in order to obtain the corrected DC offset-free data signals.

The present invention deals with the way to determine these coordinates. Current methods treat the I and Q coordinates of each data signal point of the baseband signal separately, and basically determine the average of the I and Q signal values over a set, in order to determine the coordinates of the center point. The subject method is a two-dimensional method, considering the data signals vector, composed of both the I and Q coordinates, as one point in the two-dimensional I-Q plane. In order to determine the center point of the geometrical figure, this geometrical figure is fit through part of these data signal points of the set, which do not coincide with each other. This part corresponds to a subset and contains at least the number of distinct non-coinciding points necessary to fit the geometrical figure. In the case of GSM GMSK modulation, where the data points are lying on one circle, this circle is thus fitted through such a subset of non-coinciding subsequent data points. Since a circle may be fitted through at least three non-coinciding points, in principle three subsequent non-coinciding points can thus be used for fitting this circle. Results of the fitting procedure are the coordinates of the center point. As a by-product of this fitting procedure, the radius of the circle is also obtained, the value of which may be indicative of the power of the data signals.

Mathematical procedures of how to fit a circle through at least three data points can be found in mathematical and statistical text books. A plurality of methods exist, as is well known by a person skilled in the art. Depending on the desired statistical relevance, more than 3 data point can be taken for performing the fitting. A discussion of which fitting method is to be used with regard to the desired statistical objectives, is however lying outside the scope of this document and will therefore not further be discussed in this document.

Once the I and Q coordinates of the center point are obtained, they can be subtracted from the I, resp. Q, coordinates of the baseband signal value pairs of the set, to thereby obtain the corrected DC offset-free baseband signal value pairs. In a further paragraph, some refinements with respect to this issue will be described.

The offset removing apparatus A as shown in FIG. 1 basically performs the mentioned operations. In FIG. 1 digital baseband signal value pair from which the DC offset is to be removed, is schematically denoted with SI and SQ, the output signal value pair, being the corrected DC-offset free digital baseband signal value pair, by SI' and SQ'. The offset removing apparatus A is further adapted to receive the set of digital baseband signal value pairs from which SI and SQ forms part. The DC offset calculation, consisting of first determining the subset of this set, and subsequently performing a two-dimensional fitting on it, to thereby obtain the center point coordinates, is performed in the calculation means CCM included in the offset removing apparatus A. The output signal of this calculating means consists of the coordinates of this center point, denoted with ICP1 and QCP1 in FIG. 1. The latter are provided to a subtracting means SM included in the offset removing apparatus A, which principally subtracts them from the original I and Q signal value pair SI and SQ, to thereby provide the corrected signal pairs of the set, denoted as SI' and SQ'. These are provided then as an output signal value pair of the offset removing apparatus A. This operation can be performed on all digital baseband signal value pairs of the set.

Figure 2:
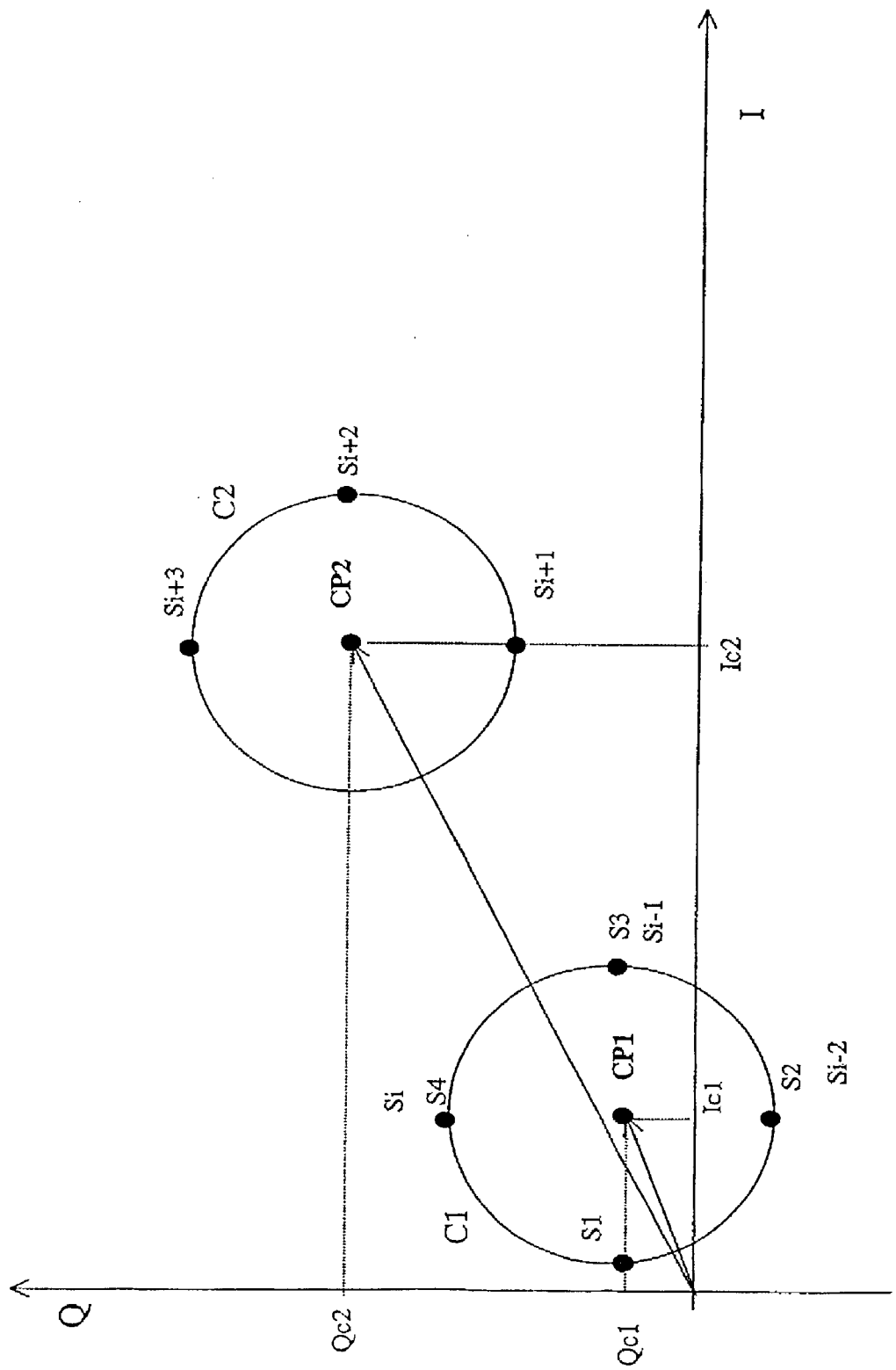
FIG. 2 is an I-Q diagram illustrating the operation of the offset removing apparatus.
Figure 3:
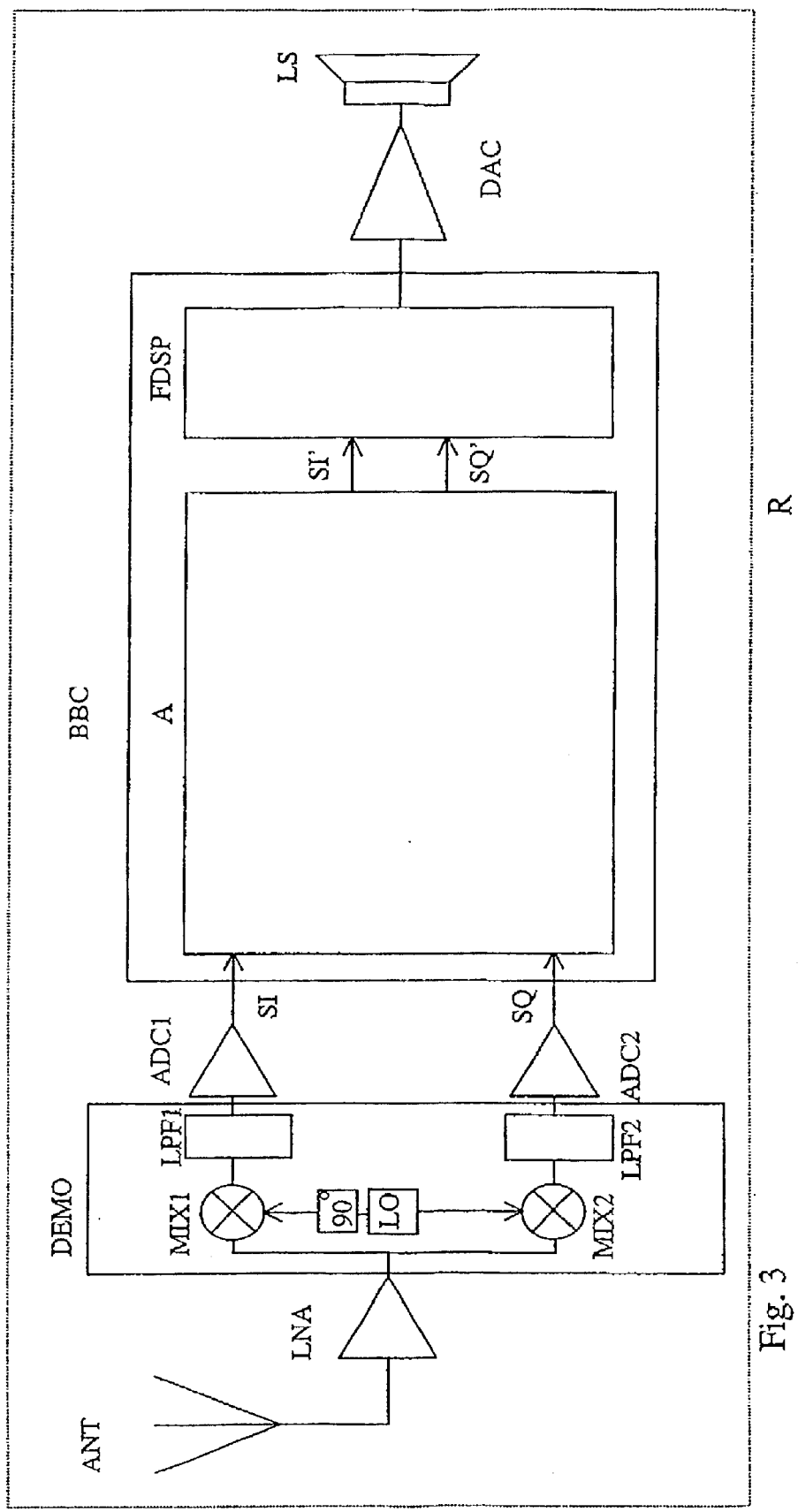
FIG. 3 represents a schematic drawing of a direct conversion receiver R, including the offset removing apparatus A of FIG. 1.

Subsequent sets or subsets of such input data may lie however on different ones of such predetermined figures. This is for instance shown in FIG. 2, showing the complex I-Q plane, with the digital baseband signals S1 to Si+3 represented as complex vectors in this plane. The I and Q coordinates of each of these vectors thus corresponds to the inphase, resp. the quadrature signal value of this digital baseband signal vector. The input signals SI and SQ of FIG. 1 can thus correspond to the I and Q coordinates of any of these samples.

In FIG. 2 samples S1,S2,S3, S4 to Si−2,Si−1 and Si are all lying on one common circle C1 with center point CP1. Samples Si+1,Si+2 and Si+3 are all lying on a second circle, denoted C2, and having center point CP2. All these data samples are however received by the offset removing apparatus A. In a GSM application, these data samples may consist of the digital baseband signals of one or more bursts. In general such a burst may contain n samples S1 to Sn. In FIG. 2 it is assumed that samples S1 to Si of one burst lie on the first circle C1, whereas samples Si+1 to Sn (not drawn on the figure) are lying on the second circle C2. This situation can for instance occur in these GSM applications due to spurious high blocking signals self-mixing. These high blocking signals, having an amplitude, which may exceed the amplitude of the data signal with even 80 dB, leak from the antenna to the local oscillator input of the mixers of the receiver. At the output of the mixers themselves this signal can then appear as a DC offset signal. These blocking signals correspond to random access burst from neighbouring GSM terminals. With the increase of GSM penetration, the probability of occurrence of such high blocking signals will also increase.

In the worst case situation i=n/2 with respect to prior art averaging methods, these high blocking signals thus appear in the middle of a burst, and affect the second half of the samples of the burst.

In case all n samples of such a burst are used for fitting one circle, it is obvious from FIG. 2 that a completely wrong center point will be found. It is therefore necessary, in order to track this varying DC offset during one burst, to perform the circle fitting several times, on several sets of data included in the burst.

If there are no frequency errors between the sender and the receiver, the samples belonging to one circle are lying on one of the four quadrant points on a circle for GSM GMSK modulation schemes as is well known by a person skilled in the art. Due to noise in the transmitter and receiver, and slight variations in the DC offset itself, these points will in fact compose a cloud of points around these four quadrant points. In order not to overload the figure this cloud is however not drawn.

In FIG. 2 it is supposed that subsequent samples S1,S2 and S3 are supposed to be non-coinciding and are therefore lying on a different quadrant point at this circle, as shown on this figure. Circle C1 can already be fitted through these 3 points. From the result of the fitting, the I and Q coordinates, denoted Ic1 and Qc1, of center point CP1 are determined, and these can accordingly be subtracted from the coordinates of S1,S2,S3 to obtain the DC offset-free values of the data signals S1,S2 and S3.

In order to track the varying values of the DC offset, this exercise can be repeated on the following three samples, or even on the next subset of three succeeding samples such as S2,S3 and S4. By the latter procedure, the DC offset is tracked in the most sensitive way. However, more points may be taken for fitting the circle, dependent on the desired statistical relevance. A trade-off thus exists between the sensitivity in detecting DC offset changes, and statistical relevance of the fit.

As is shown in FIG. 2, the DC offset suddenly changes from sample Si to Si+1. This represents itself by a sudden jump from the received data points from the first circle C1 to the second circle C2. It is supposed in FIG. 2 that from then on, the remainder of the data signals from the received burst will substantially have this DC offset.

Following the described methodology where subsequent sets of 3 succeeding samples are used for performing the circle fitting, the circle fitted through data samples Si-2, Si-1, and Si will still substantially correspond to circle C1 with center point CP1. Fitting however through samples Si-1,Si and Si+1, will result in a completely different circle (not drawn on FIG. 2). This will also be the case for the circle through data samples Si, Si+1 and Si+2. The circle C2 with center point CP2, center point coordinates Ic2 and Qc2, through Si+1, Si+2 and Si+3 will again be different. But all subsequent fitted circles will then again correspond to circle C2.

In case the obtained center point coordinates are subtracted immediately from the samples through which the fitted circle was obtained, the aforementioned methodology will yield three subsequently different corrected values. For the previous example where Si forms part of circle C1, the not drawn circle through Si-1,Si and Si+1, and the not drawn circle through Si,Si+1 and Si+2, thus three different correction values for Si will be obtained whereby only the first one is correct. In the case whereby the method continuously corrects each point with the latest obtained DC offset, an error can thus occur. This error however only affects three points, or the number of points used for fitting the circle. But even this error can be eliminated by performing for instance a post-processing operation on the subsequent obtained center points. This allows to first detect the change in the DC offset, after which step the correct center points can be determined, based on the fact that DC offset due to high blocking signals self—mixing remains constant for the rest of the burst. Once the two center points are then localised, the corresponding circles can be retrofitted, from which it will become clear which sample is lying on which circle. Once this is known, the correct subtraction can take place.

It is evident that the latter method requires however a lot of extra processing. It will therefore depend on the application whether this large accuracy is needed, or whether it is allowed to have a smaller accuracy, allowing more samples to be corrected in the wrong way, but increasing the bit-error-rate.

Other procedures may of course be used, thereby artificially dividing the data of a burst in an artificial number of sets, for instance 2 or four, and then performing circle fittings on these sets or on subsets of them. In this case it is not a priori known whether all samples of such a set belong to one common circle, this detection is performed afterwards, after which step corrected sets can be determined.

In order to perform this extra processing, both the computation means CCM, as well as the subtracting means SM need to include enough memory to temporarily store the data points of one burst. In addition a post-processing means is to be included in the computation means (not shown in FIG. 1), for performing the above mentioned operations on successive values of the determined center points.

In addition, depending on the chosen variant of the method, the computation means has to determine, from the incoming samples of one burst, the sets, and the subsets from the sets, for fitting the circle through. For determining of the subset, a discrimination algorithm can be used relying on the fact that 3 samples of such a subset need to differ by a predetermined relative or absolute difference in value. Once such a subset is determined, a circle fitting procedure may be used for obtaining the circle through this subset.

How to realise such circuits and all mentioned variants is generally known by a person skilled in the art and will therefore not be described in more detail in this document. A suitable embodiment for implementing these described functions consists of a digital signal processor, which may be programmed for realising the desired functionality or algorithm.

A burst mode direct conversion receiver R including an offset removing apparatus A according to the invention is shown in FIG. 1. Therein a receiver for a GSM application is shown, but the offset removing apparatus of the invention may as well be part of other direct conversion receivers such as for instance used in hybrid fiber coax applications. The GSM receiver of FIG. 1 includes well-known parts such as a receive means, in GSM applications consisting of an antenna ANT, for receiving analog signals which each correspond to a digital signal modulated on a high frequency carrier. The receive means is coupled to an input of a low noise high frequency amplifier LNA. An output of LNA is coupled to a demodulating means DEMO of the direct conversion type which converts the received analog high frequency signal from the high frequency carrier band to the baseband (0 Hz). In the drawing of FIG. 1 an embodiment of this demodulating means for GSM applications is shown and is composed of two mixers MIX1,MIX2 which receive the output signal from the LNA as well as a local oscillator signal or this local oscillator signal shifted by 90 degrees. This local oscillator signal and its 90 degrees phase shift signal are respectively provided by a local oscillator LO and by a phase shift means denoted 90°. Due to leakage at the antenna, unwanted or parasitic signals are also input to the mixer, which accordingly transforms them also into a baseband DC component. How this occurs, even for input signals at a different frequency than the carrier frequency of the local oscillator, is explicitly stated in the published European Patent Application, publication number EP 0594894 A1, on page 8.

This unwanted DC baseband component is thus the DC-offset, which is to be compensated since further processing of the DC baseband signal would otherwise lead to serious errors.

The output signal of the mixers consists of a set of two demodulated analog signal parts, one corresponding to a so-called inphase channel, the second corresponding to a so-called quadrature channel. These inphase and quadrature analog channels are then filtered in the lowpass filters LPF1 and LPF2, and further undergo an analog-digital conversion in respective A-D converters ADC1 and ADC2. The output signal of ADC1 then consists of a digital inphase baseband signal, denoted with SI, the output signal of ADC2 of a digital quadrature baseband signal, denoted with SQ.

Both digital signal components are then further processed into a baseband circuit, denoted BBC. In general this circuit consists of a digital signal-processing unit, of which the offset removing apparatus forms one part. In order to however distinguish the latter function, the offset removing apparatus A is drawn as a separate device from the further digital signal-processing unit FDSP.

The corrected data values, denoted with SI' and SQ' are then delivered to the further digital signal processing unit, denoted FDSP, which thereon performs additional processing related to equalisation, and other function depending on the specific application. This final processed information is then input to a D-A converter DAC, which subsequently forwards the analog signal to an output, means, consisting of a loudspeaker LS in case of a GSM receiver.

In other receivers according to the invention, not all of the above mentioned functions that are related to GSM may be necessary. However the offset removing apparatus and the principles of operation of it, can still be applied.

While the principles of the invention have been described above in connection with specific apparatus, it is to be clearly understood that this description is made only by way of example and not as a limitation on the scope of the invention, as defined in the appended claims.

What is claimed is:

1. A method for removing DC offset from a digital baseband signal value pair included in a set of digital baseband signal value pairs, each pair of said set being made up of an inphase signal value and a corresponding quadrature signal value such that, if plotted on an I-Q diagram with the inphase signal value of each pair denoting distance of a plotted point from a Q-axis and the quadrature signal value of that pair denoting distance of that plotted point from an I-axis that is orthogonal to said Q-axis, the plotted points would lie substantially on a predetermined geometrical figure in the plane formed by said I-axis and said Q-axis, said method comprising the steps of:

determining said DC offset, as the I and Q coordinates of a central point of said predetermined geometrical figure by a two-dimensional fitting of said predetermined geometrical figure through a subset of signal value pairs included within said set of digital baseband signal/value pairs;

subtracting said DC offset from said digital baseband signal/value pair; and delivering the resulting signal value pair as an output signal.

2. The method according to claim 1, wherein said step of subtracting comprises subtracting from the inphase signal value of said digital baseband signal/value point, said I coordinate of said central point, and subtracting from the quadrature signal/value of said digital baseband signal/value pair, said Q coordinate of said central point, the resulting inphase and quadrature values thereby constituting said output signal.

3. The method according to claim 2, wherein said digital baseband signal value pairs of said set correspond to at least part of the digital baseband signal value pairs from at least one burst of a carrier wave modulated signal, and said subset thereby includes at least as many substantially distinct signal value pairs, as required to fit said geometrical figure.

4. The method according to claim 3, further comprising determining from said at least one burst, subsequent ones of said sets, wherein said method is repeated on said subsequent ones of said sets.

5. An offset removing apparatus for removing DC offset from a digital baseband signal value pair included in a set of digital baseband signal-value pairs, each pair of said set being made up of an inphase signal value and a corresponding quadrature signal value such that, if plotted on an I-Q diagram with the inphase signal value of each pair denoting distance of a plotted point from a Q-axis and the quadrature signal value of that pair denoting distance of that plotted point from an I-axis that is orthogonal to said Q-axis, the plotted points would lie substantially on a predetermined geometrical figure in the plane formed by said I-axis and said Q-axis, said offset removing apparatus comprising:

calculating means adapted to determine said DC offset, as the I and Q coordinates of a central point of said predetermined geometrical figure by a two-dimensional fitting of said predetermined geometrical figure through a subset of signal value pairs included within said set of digital baseband signal value pairs; and subtracting means coupled to said calculating means and being adapted to receive the inphase, signal value and the quadrature signal value of said digital baseband signal/value pair of said set, subtract said DC offset from said digital baseband signal value pair, and provide the resulting signal value pair as an output signal value pair to an output terminal of said apparatus.

6. The offset removing apparatus according to claim 5 wherein said subtracting means is further adapted to receive said I-coordinate, and said Q-coordinate; of said central point and to subtract from said inphase, signal value and said quadrature; signal value, said I-coordinate, and said Q-coordinate of said central point, and to deliver the resulting inphase, signal value and the quadrature signal value, as said output signal value pair of said offset removing apparatus.

7. The offset removing apparatus according to claim 5, wherein said digital baseband signal/value pairs of said set correspond to at least part of the digital baseband signal value pairs from at least one burst of a carrier wave modulated signal, and said offset removing apparatus, said calculation means and said subtraction means thereby being adapted to receive said digital baseband signal value pairs from said at least one burst, whereby said subset includes at least as many substantially distinct signal value pairs, as required to fit said geometrical figure.

8. The offset removing apparatus according to claim 7, wherein said calculation means is further adapted to determine from said at least one burst, subsequent ones of said sets and to repeat said two-dimensional fitting on said subsequent ones of said sets.

9. A burst mode receiver comprising:

receiving means adapted to receive at least one burst of an analog carrier wave modulated signal;

demodulating means coupled to said receiving means and adapted to demodulate said analog carrier wave modulated signal into two orthogonal analog baseband signal;

analog-digital conversion means coupled to said demodulating means and adapted to perform an analog-digital conversion on said two orthogonal analog baseband signals so as to provide at least one set of digital baseband signal/value pairs, each pair being made up of an inphase signal value and a corresponding quadrature signal value such that, if plotted on an I-Q diagram with the inphase signal value of each pair denoting distance of a plotted point from a Q-axis and the quadrature signal value of that pair denoting distance of that plotted point from an I-axis that is orthogonal to said Q-axis, the plotted points would lie substantially on a predetermined geometrical figure in the plane formed by said I-axis and said Q-axis; and an offset removing apparatus which is coupled to said analog-digital conversion means, said burst mode receiver further including additional baseband processing means coupled to said offset removing apparatus and adapted to further process output signals of said offset removing apparatus wherein said offset removing means comprises:

calculating means adapted to determine a DC offset as the I and Q coordinates of a central point of said predetermined geometrical figure by a two-dimensional fitting of said predetermined geometrical figure through a subset of signal value pairs included within said set of digital baseband signal value pairs; and a subtracting means coupled to said calculating means and being adapted to receive the inphase signal value and the quadrature signal value of said digital baseband signal-value pair of said set, subtract said DC offset from said digital baseband signal value pair, and deliver the resulting signal value pair as an output signal value pair to an output terminal of said offset removing apparatus.

\* \* \* \* \*

UNITED STATES PATENT AND TRADEMARK OFFICE
CERTIFICATE OF CORRECTION

PATENT NO.     : 6,707,860 B1
DATED          : March 16, 2004
INVENTOR(S)    : Joannes Mathilda Josephus Sevenhans It is certified that error appears in the above-identified patent and that said Letters Patent is hereby corrected as shown below:

Column 9,
Lines 1-9, delete claim 6 in its entirety and insert:

6. The offset removing apparatus according to claim 5 wherein said substracting means is further adapted to receive said I-coordinate and said Q-coordinate of said central point and to subtract from said inphase signal value and said quadrature signal value, said I-coordinate and said Q-coordinate of said central point, and to deliver the resulting inphase signal value and the quadrature signal value, as said output signal value pair of said offset removing apparatus.

Signed and Sealed this

Sixth Day of July, 2004

JON W. DUDAS
*Acting Director of the United States Patent and Trademark Office*